(12) United States Patent
Gupta

(10) Patent No.: US 10,119,261 B2
(45) Date of Patent: Nov. 6, 2018

(54) ADJUSTABLE HINGE FASTENERS FOR USE WITH A BIDET WASHING APPARATUS

(71) Applicant: Anjum Gupta, San Diego, CA (US)

(72) Inventor: Anjum Gupta, San Diego, CA (US)

( * ) Notice: Subject to any disclaimer, the term of this patent is extended or adjusted under 35 U.S.C. 154(b) by 0 days.

(21) Appl. No.: 15/165,810

(22) Filed: May 26, 2016

(65) Prior Publication Data
US 2017/0342695 A1 Nov. 30, 2017

Related U.S. Application Data

(62) Division of application No. 14/261,605, filed on Apr. 25, 2014, now Pat. No. 9,637,903.

(51) Int. Cl.
| | | |
|---|---|---|
| *E03D 9/00* | (2006.01) | |
| *E03D 9/08* | (2006.01) | |
| *F16C 11/04* | (2006.01) | |
| *F16M 13/02* | (2006.01) | |

(52) U.S. Cl.
CPC .............. *E03D 9/08* (2013.01); *F16C 11/045* (2013.01); *F16M 13/02* (2013.01)

(58) Field of Classification Search
CPC ...................................................... A47K 13/26
USPC ...... 4/420.1–420.4, 447, 240, 443, 448, 236
See application file for complete search history.

(56) References Cited

U.S. PATENT DOCUMENTS

| | | | |
|---|---|---|---|
| 7,065,802 B2 * | 6/2006 | Jung ......................... | E03D 9/08 4/420.2 |
| 2016/0010319 A1 * | 1/2016 | Willers ..................... | E03D 9/08 4/448 |

* cited by examiner

*Primary Examiner* — Christine Skubinna

(57) ABSTRACT

The disclosure provides adjustable hinge fasteners and methods thereof, for securing a bidet washing apparatus to a toilet.

7 Claims, 26 Drawing Sheets

ADJUSTABLE HINGE FASTENERS FOR USE WITH A BIDET WASHING APPARATUS

CROSS-REFERENCE TO RELATED APPLICATIONS

This application is a divisional of and claims the benefit of priority under 35 U.S.C. §120 to U.S. patent application Ser. No. 14/261,605, filed Apr. 25, 2014, titled "ADJUSTABLE HINGE FASTENERS FOR USE WITH A BIDET WASHING APPARATUS," the entire disclosure of which is hereby incorporated by reference in its entirety for all purposes.

TECHNICAL FIELD OF THE INVENTION

The present disclosure generally relates to a bidet washing apparatus, and in particular, the invention relates to adjustable hinge fasteners for use with a bidet washing apparatus.

BACKGROUND OF THE INVENTION

Bidet apparatuses for washing and cleaning body parts (e.g., genital and/or anal regions) with water were originally developed in the form of a bidet that provided a single spray of water from a permanently attached fixture built into a toilet bowl. However, such bidets were expensive and a new generation of attachable bidets with a plurality of nozzles for multiple water sprays was developed. These bidets may be attached to the sitting area of a toilet bowl for washing the body parts of a person, as well as the bidet itself, using water sprayed from the bidet nozzles.

Various attachable bidet designs have provided some of the desired washing and cleaning effects; however, existing bidets fail to address all concerns related to the design and function of bidets. For example, some attachable bidet apparatuses may not be suitable for use with all toilet bowls due to the structural differences or variations present in the connecting portions of the apparatus and the securing holes present on the toilet bowl. In addition, contamination or pollution of the bidet apparatus during use, including the under surfaces of the bidet and the outer surfaces of the nozzles, is a common problem that causes aesthetic and hygienic issues. Cleaning these surfaces may be problematic due to the inconvenience and difficulty in effectively reaching all of the contaminated areas, especially with the way most bidet apparatuses are more or less permanently attached to the toilet bowl. These problems are particularly important in bidets used, for example, by infirm or sick people who have to be especially cautious about maintaining hygiene and preventing infections.

There remains a need for an improved attachable bidet apparatus that allows a user to easily attach and/or clean the apparatus and toilet for aesthetic and hygienic reasons.

SUMMARY OF THE INVENTION

The following detailed description is of the best currently contemplated mode of carrying out exemplary embodiments herein. The description is not to be taken in a limiting sense, but is made merely for the purpose of illustrating the general principles of the exemplary embodiments herein, since the scope of the disclosure is best defined by the appended claims.

Various inventive features are described below that may each be used independently of one another or in combination with other features.

Broadly, embodiments of the disclosure herein generally provide a bidet washing apparatus adjustably attachable to a toilet bowl for cleaning one or more body parts of a user, including: one or more adjustable hinge fasteners for adjustably securing the bidet washing apparatus to the toilet bowl; one or more water inlets configured to supply water; a control unit, housing one or more valves fluidically connected to the one or more water inlets, including one or more control switches configured to operate the one or more valves, wherein the one or more valves control water flow from the one or more water inlets; a nozzle assembly including at least one washing nozzle, fluidically connected to at least one of the one or more valves with one or more water tubes, wherein the at least one washing nozzle is positioned for directing water to the one or more body parts of the user; and a protective shield gate covering at least a portion of the at least one washing nozzle, wherein the protective shield gate is coupled to the bidet washing apparatus.

In an embodiment, a method of attaching a bidet washing apparatus to a toilet bowl includes: attaching one end of the one or more adjustable hinge fasteners to securing holes in the toilet bowl; and attaching the other end of the one or more adjustable hinge fasteners to the bidet washing apparatus.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF THE INVENTION

Figure 1:
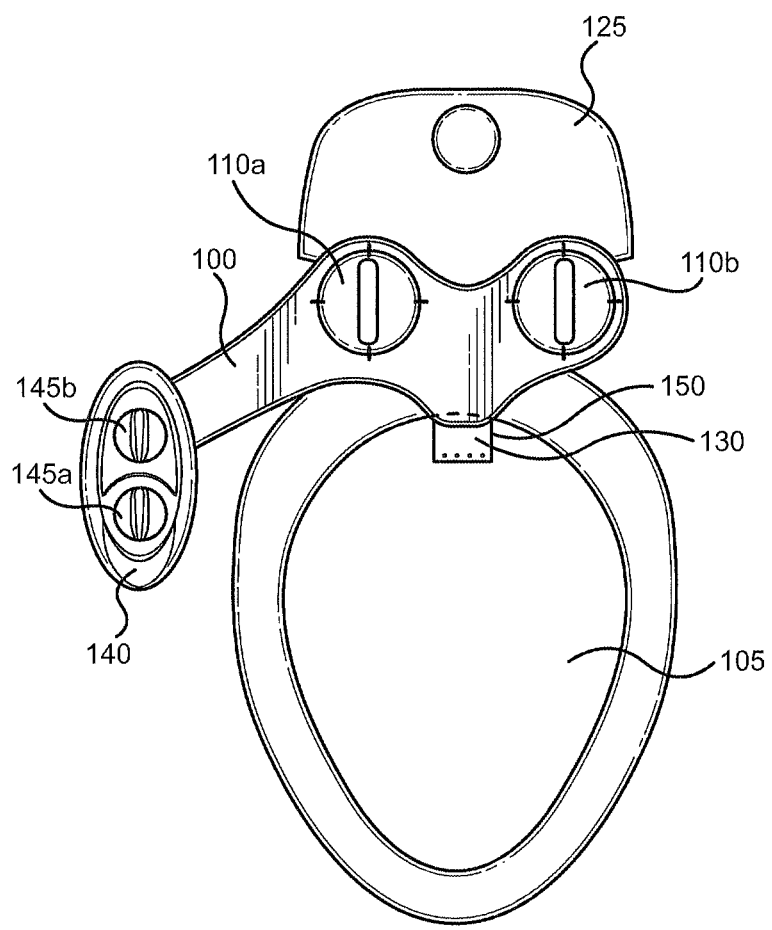
FIG. 1 is a top perspective view of a bidet washing apparatus installed on a toilet bowl without a seat.

The following description is presented to enable a person of ordinary skill in the art to make and use the embodiments described herein. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the disclosure. Thus, the present disclosure is not intended to be limited to the examples described herein and shown, but is to be accorded the scope consistent with the claims.

As used herein, the word "exemplary" means "serving as an example illustration." Any aspect or design described herein as "exemplary" is not necessarily to be construed as preferred or advantageous over other aspects or designs. It should be understood that the specific order or hierarchy of steps in the process disclosed herein is an example of exemplary approaches. Based upon design preferences, it is understood that the specific order or hierarchy of steps in the processes may be rearranged while remaining within the scope of the present disclosure. Any accompanying method claims present elements of the various steps in a sample order, and are not meant to be limited to the specific order or hierarchy presented.

As described herein, a "bidet" is a toilet attachment for cleaning the body parts of the user.

As described herein, the term "water inlet" means any structure that may provide water to the bidet washing apparatus.

As described herein, the term "control unit" (aka "control panel") refers to the housing that has "control switche(s)" thereon, for controlling the various functionalities of the bidet, including but not limited to: controlling the flow of water through the nozzles; controlling and/or adjusting the angle of the nozzles; and controlling the opening and/or closing of the protective shield gate.

As described herein, the term "control valves" refers to the controller parts located inside the control panel housing, which controls the flow of water or other fluids from the water inlet(s) to one or more "water tubes," by opening, closing or partially obstructing various passageways.

As described herein, the term "water tubes" refers to channels that connect the control valves to a "nozzle assembly."

As described herein, the term "nozzle assembly" refers to a single nozzle or a collection of nozzles comprising at least one "washing nozzle." As described herein, the term "nozzle assembly" may also have other types of nozzles such as a "self cleaning nozzle," which is used to clean the nozzle assembly itself, a "toilet cleaning nozzle," which is used to clean the bidet and/or the toilet, and a "shield cleaning nozzle," which is used for cleaning the "protective shield gate."

As described herein, the term "nozzle" refers to a device designed to eject water or other fluids as a coherent controlled spray.

As described herein, the term "washing nozzle" refers to the nozzle that may be used to wash the body parts of a user.

As described herein, the term "protective shield gate" refers to a structure placed at least partially in front of the nozzle assembly (e.g., between the user and the nozzle assembly) to protect the nozzle assembly from pollutants. In some embodiments, the protective shield gate may have a "hinged" edge.

As described herein, the term "adjustable hinge" or "adjustable hinge fastener" is a generic term for any rotationally adjustable hinge fastener, slidably adjustable hinge fastener, or grasping slidably adjustable hinge fastener that is used to fasten or secure a bidet washing apparatus to a toilet bowl, and which allows the apparatus to independently moved in a horizontal direction and to pivot in a vertical direction.

As described herein, the term "hinged" refers to a joint that allows the turning or pivoting of the protective shield gate, by any conventional turning or pivoting mechanism.

As described herein, the term "fluidically coupled" refers to a connection or a passageway that allows fluid to flow therethrough, As described herein, the term "reservoir" refers to a fluid holding tank.

The various embodiments disclosed herein provide a new, clean and hygienic bidet washing apparatus with one or more adjustable hinge fasteners, which may be attachable to an existing toilet for cleaning the body parts of the user sitting on or near the toilet.

Figure 2:
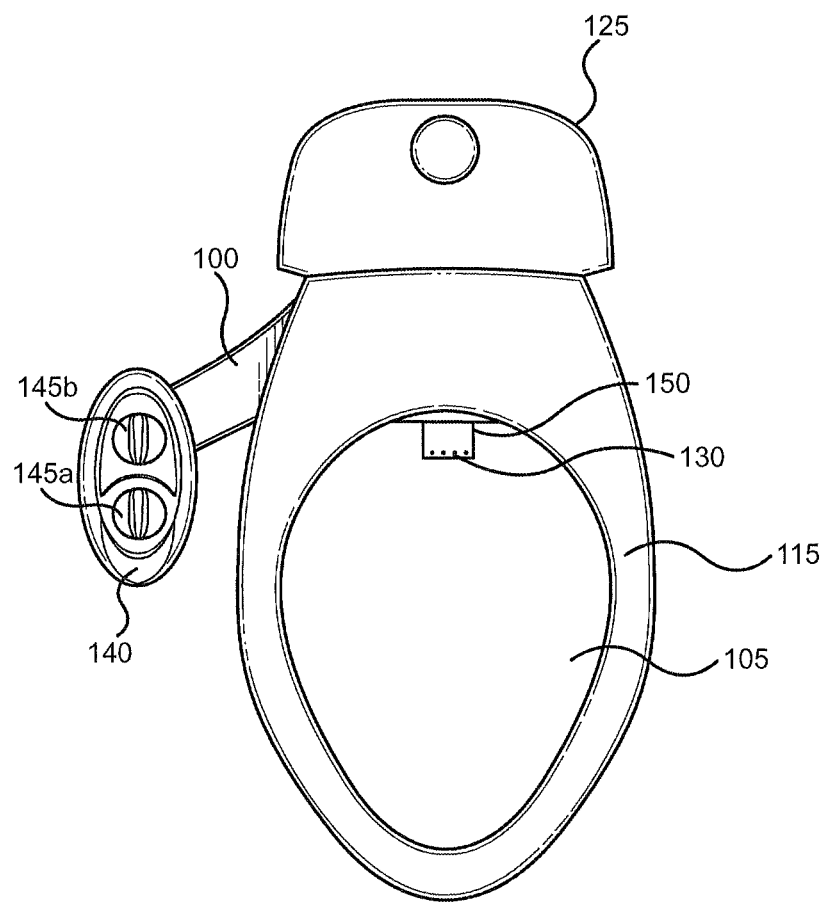
FIG. 2 is a top perspective view of a bidet washing apparatus installed on a toilet bowl with the toilet seat down.

FIGS. 1 and 2 illustrate a top view of a bidet washing apparatus 100 mounted on top of a toilet bowl 105 using securing mechanisms 110a and 110b. FIG. 1 illustrates the bidet washing apparatus 100 on top of the toilet bowl 105 without a toilet seat; whereas FIG. 2 illustrates the bidet washing apparatus 100 on top of the toilet bowl 105 with a toilet seat 115 in the down position. The toilet seat 115 may pivot around, and may be connected to, a rear portion, e.g., securing holes 120a and 120b (not shown), of the toilet bowl 105, thereby partially covering the bidet washing apparatus 100 and the toilet bowl 105 when the toilet seat 115 is in the down position. A refillable toilet tank 125 may be mounted on the rear portion of the toilet bowl 105, in which an amount of water may be stored. In some embodiments, the toilet tank 125 may be used as a water source for flushing and/or operating the bidet washing apparatus 100 by a fluidic connection to the apparatus.

Figure 3:
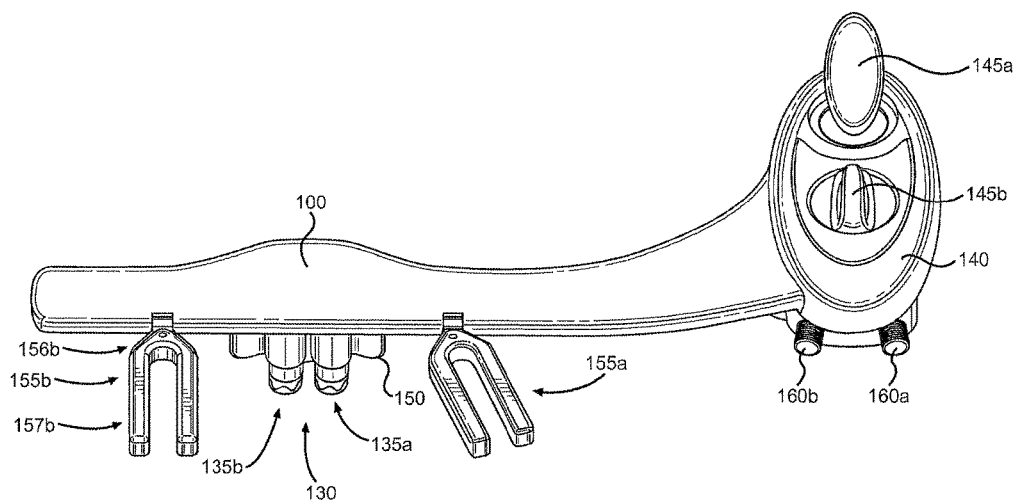
FIG. 3 is a top, rear perspective view of a bidet washing apparatus with rotationally adjustable hinge fasteners.

The bidet washing apparatus 100 may include a nozzle assembly 130, which includes at least one washing nozzle for washing one or more body parts, e.g. anus and genitals, of a user sitting on or near the toilet bowl 105. In an embodiment, the bidet washing apparatus 100 may include a nozzle assembly 130 having two washing nozzles 135a and 135b as shown in FIG. 3. However, in other embodiments a lesser or greater number of washing nozzles may be used. In some embodiments, each washing nozzle may independently spray a stream of water upwardly and inwardly towards the user.

As shown in FIGS. 1-3, the bidet washing apparatus 100 may include a control unit 140 for easy access to the user. The control unit 140 houses control switches 145a and 145b, which provide operating instructions to the bidet washing apparatus 100. The depicted example in FIGS. 1-3 shows two control switches 145a and 145b; however, one of ordinary skill in the art would realize that any number of switches may be provided for performing various operations, without departing from the scope of the present disclosure. Some examples of operating instructions include but are not limited to: controlling the flow of water from a water inlet; controlling the angle of the washing nozzles; and controlling the opening and closing of a protective shield gate for protecting the washing nozzles. The type of control switches include but are not limited to knobs, dials, levers, and depressible buttons, or any conventional control mechanism known to those of skill in the art. In an embodiment, the bidet washing apparatus 100 may have all similar control switches, wherein both control switches 145a and 145b are knobs, dials, or levers. In other embodiments, the bidet washing apparatus 100 may have a control switch 145a that is a knob, and a control switch 145b that is a dial or lever and/or vice-versa.

As shown in FIGS. 1-3, the bidet washing apparatus 100 may include a nozzle assembly 130, which has a protective shield gate 150 substantially or partially in front of it. The position of the protective shield gate 150 allows it to act as a shield between the user's body and/or water in the toilet bowl 105, and the nozzle assembly 130, thus protecting the nozzle assembly 130 from contamination or pollution during use. Various other embodiments and features of the bidet washing apparatus are disclosed in U.S. Patent Application Publication Ser. No. 14/261,605, the disclosure of which is hereby incorporated by reference.

In various embodiments, the bidet washing apparatus 100 may be adjustably attachable to the toilet bowl 105 through one or more adjustable hinge fasteners present on the bidet washing apparatus, to securing holes 120a and 120b (not shown) present on the toilet bowl 105. In exemplary embodiments, the one or more adjustable hinges include, but are not limited to: one or more rotationally adjustable hinges; one or more slidably adjustable hinge fasteners; and/or one or more grasping slidably adjustable hinge fasteners.

FIG. 3 illustrates a top, rear view of an embodiment of rotationally adjustable hinge fasteners for attaching a bidet washing apparatus 100 to a toilet bowl 105. As shown, this includes rotationally adjustable hinge fasteners 155a and 155b; nozzle assembly 130; washing nozzles 135a and 135b; protective shield gate 150; control unit 140; control switches 145a and 145b; and water inlets 160a and 160b. In an embodiment, water inlets 160a and 160b may be attachable to a water source, for example, the refillable water tank 125.

As shown in FIG. 3, the rotationally adjustable hinge fasteners 155a and 155b may each be independently rotated in a horizontal direction relative to the bidet washing apparatus 100, thus facilitating attachment of the bidet washing apparatus 100 to the toilet bowl 105 through toilet bowl securing holes 120a and 120b (not shown). The rotationally adjustable hinge fasteners 155a and 155b may also each be independently pivoted or raised in a vertical direction relative to the bidet washing apparatus 100, thus facilitating cleaning of the bidet washing apparatus 100 and toilet bowl 105. In addition, the rotationally adjustable hinge fasteners 155a and 155b also enables a user to change the angle of the nozzle assembly 130 by raising or lowering the bidet washing apparatus 100 during use. That is, the hinged operation is not only useful for being able to clean the toilet bowl or for easy installation, it can also be used as an apparatus that makes the whole bidet (and the nozzle angle) adjustable.

As shown in FIG. 3, in an embodiment the rotationally adjustable hinge fasteners 155a and 155b may be arch shaped structures, each having an arch 156a and 156b, which connects with two arms 157a and 157b. In some embodiments, the arches 156a and 156b, and the two arms 157a and 157b may be solid or hollowed out structures. The rotationally adjustable hinge fasteners 155a and 155b may each independently be attachable to the rear of the bidet washing apparatus 100 at about the region of their arches 156a and 156b. In addition, the rotationally adjustable hinge fasteners 155a and 155b may each independently be attachable to toilet bowl securing holes 120a and 120b (not shown) through their two arms 157a and 157b using a bolt, nut and washer fastening assembly (not shown), or any other suitable fastening assemblies known in the art.

Figure 4:
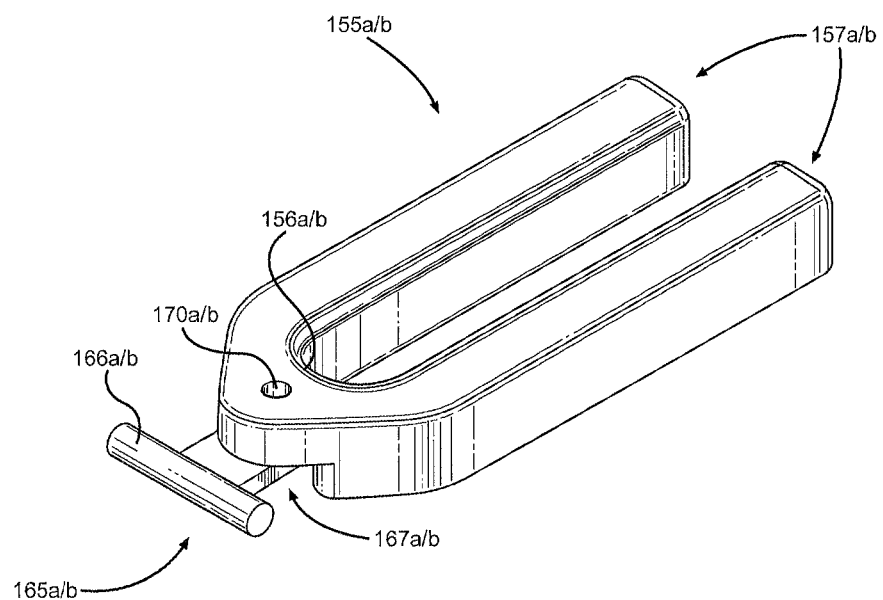
FIG. 4 is top, front, side perspective view of a rotationally adjustable hinge fastener.

FIG. 4 illustrates a top, front, side view of the rotationally adjustable hinge fasteners 155a or 155b, each of which may be independently attachable to the rear of the bidet washing apparatus 100 through their arches 156a or 156b. In an embodiment, a T-shaped bar 165a or 165b, having an cylindrical top 166a or 166b, and a base 167a or 167b, may be used to connect the bidet washing apparatus 100 to the rotationally adjustable hinge fasteners 155a and 155b. As shown, base 167a or 167b is connected to arches 156a or 156b with a screw 170a or 170b.

Figure 5:
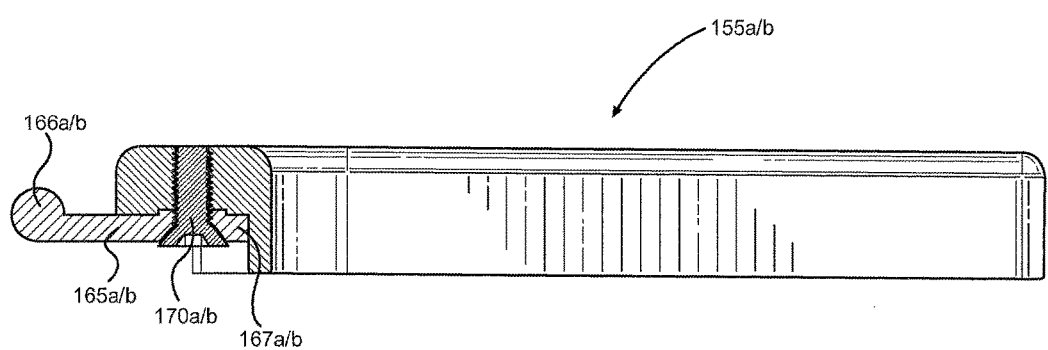
FIG. 5 is a side perspective view of a rotationally adjustable hinge fastener.

FIG. 5 illustrates a side view of the rotationally adjustable hinge fasteners 155a or 155b, and the T-shaped bar 165a or 165b, with cylindrical top 166a or 166b, and a base 167a or 167b. As shown, the base 167a or 167b is connected to arch 156a or 156b with a screw 170a or 170b.

Figure 6:
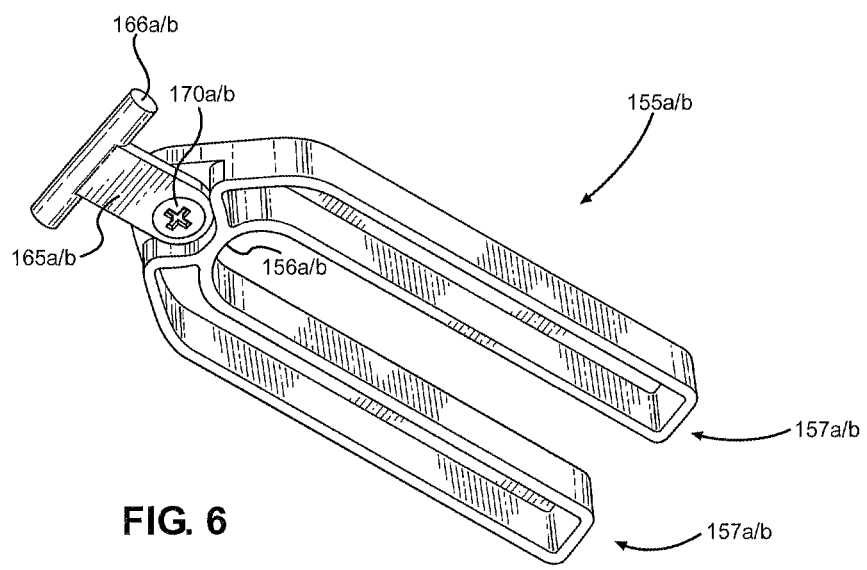
FIG. 6 is a bottom, front, side perspective view of a rotationally adjustable hinge fastener.

FIG. 6 illustrates a bottom, front, side view of the rotationally adjustable hinge fasteners 155a or 155b, and the T-shaped bar 165a or 165b with cylindrical top 166a or 166b, and base 167a or 167b. As shown, the base 167a or 167b is connected to arches 156a or 156b with a screw 170a or 170b. In an embodiment, the base 167a or 167b is curved or rounded and sits in a complimentary curved or rounded section of the arches 156a or 156b, which allows the rotationally adjustable hinge fasteners 155a or 155b to independently rotate, thus facilitating attachment of the bidet washing apparatus 100 to the toilet bowl 105 through toilet bowl securing holes 120a and 120b (not shown).

Figure 7:
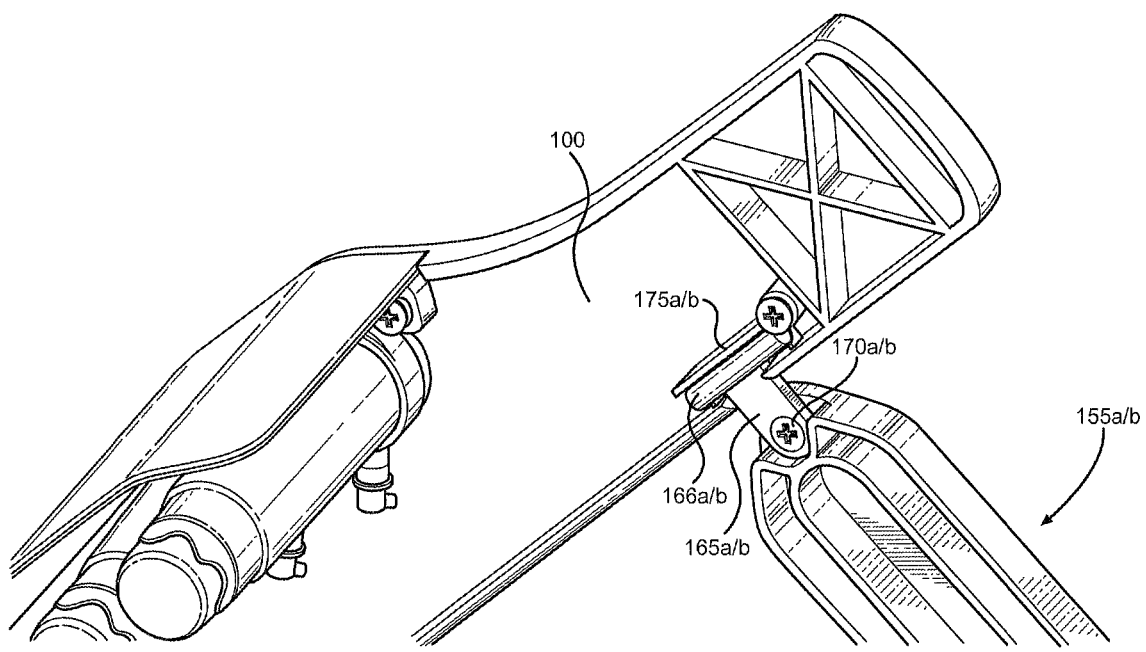
FIG. 7 is a bottom perspective view of a bidet washing apparatus and a rotationally adjustable hinge fastener.

FIG. 7 illustrates a bottom view of the bidet washing apparatus 100, which includes the rotationally adjustable hinge fasteners 155a or 155b, and T-shaped bar 165a or 165b, with cylindrical top 166a or 166b, and base 167a or 167b. As shown, the base 167a or 167b is connected to arches 156a or 156b with a screw 170a or 170b. A holder 175a or 175b may be present on and/or in the bidet washing apparatus 100, for pivotally holding and/or connecting to the cylindrical top 166a or 166b of the T-shaped bar 165a or 165b. This arrangement allows the rotationally adjustable hinge fasteners 155a and 155b to pivot, or move up and down in a vertical direction, thus facilitating cleaning of the bidet washing apparatus 100 and toilet bowl 105.

Figure 8:
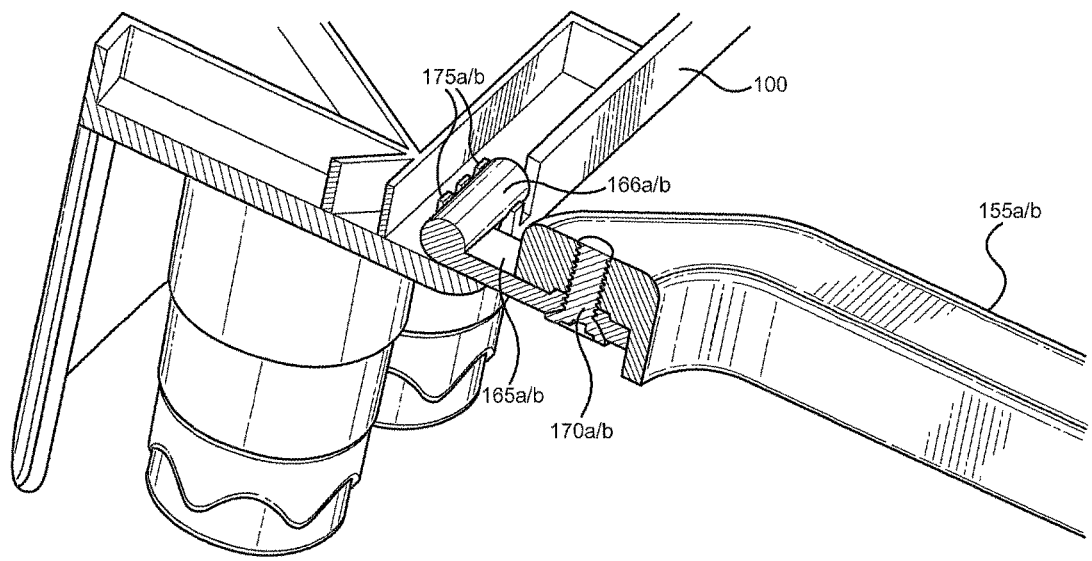
FIG. 8 is a cut-away top, side, rear perspective view of a bidet washing apparatus and a rotationally adjustable hinge fastener.

FIG. 8 illustrates a cut-away top, side, rear view of the bidet washing apparatus 100, which includes the rotationally adjustable hinge fasteners 155a or 155b, and T-shaped bar 165a or 165b, with cylindrical top 166a or 166b, and base 167a or 167b. As shown, the base 167a or 167b is connected to arches 156a or 156b with a screw 170a or 170b. Also shown is the holder 175a or 175b present on and/or in the bidet washing apparatus 100, for pivotally holding and/or connecting to the cylindrical top 166a or 166b of the T-shaped bar 165a or 165b.

Figure 9:
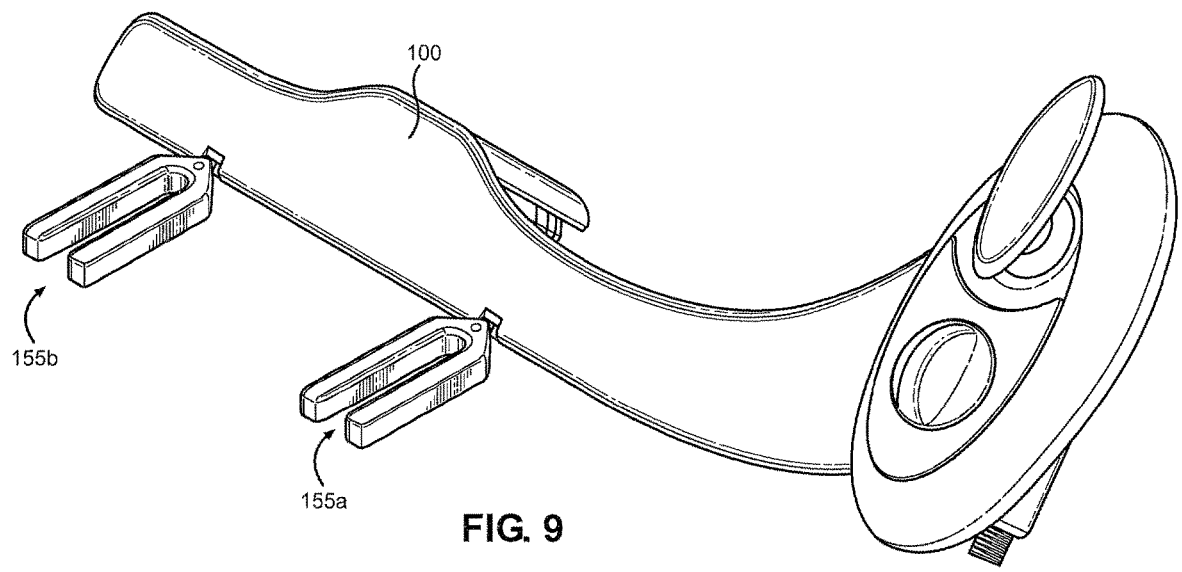
FIG. 9 is a top, side, rear perspective view of a bidet washing apparatus and rotationally adjustable hinge fasteners.

FIG. 9 illustrates a top, side, rear view of the bidet washing apparatus 100 and rotationally adjustable hinge fasteners 155a and 155b. As shown, the rotationally adjustable hinge fasteners 155a and 155b may pivot in a vertical direction relative to the bidet washing apparatus 100, allowing the bidet washing apparatus 100 to be raised from a horizontal to a more vertical position and lowered to its original horizontal position.

Figure 10:
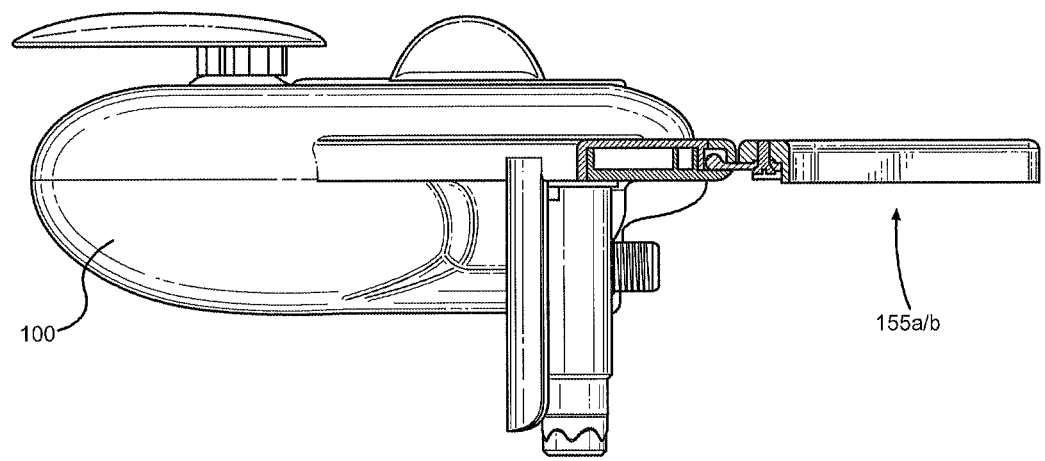
FIG. 10 is a side, horizontal perspective view of a bidet washing apparatus and a rotationally adjustable hinge fastener.

FIG. 10 illustrates a side, horizontal view of the bidet washing apparatus 100 and rotationally adjustable hinge fasteners 155a or 155b.

Figure 11:
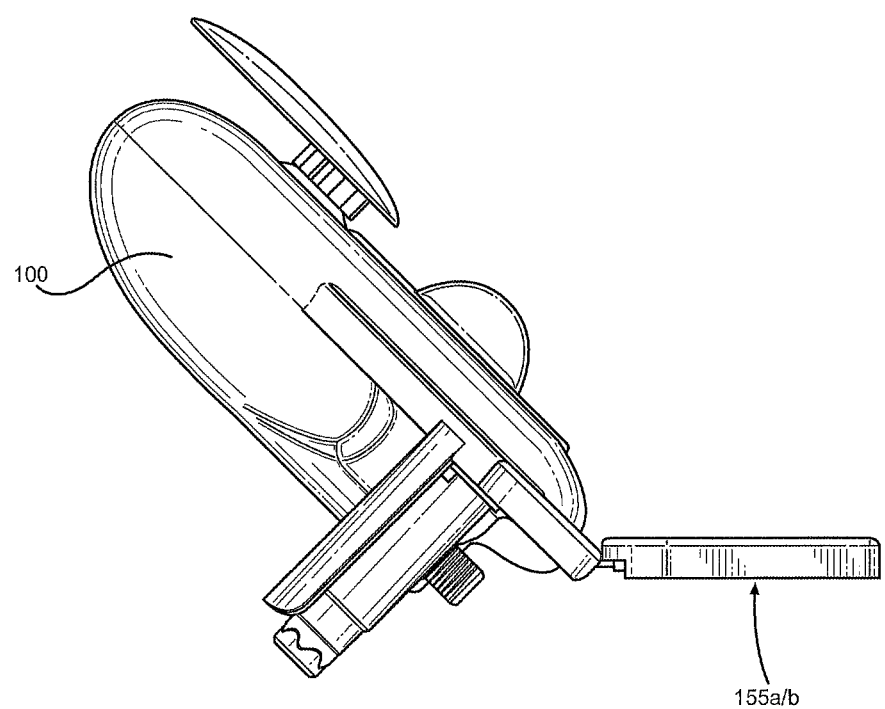
FIG. 11 is a side, vertical perspective view of a bidet washing apparatus and a rotationally adjustable hinge fastener.

FIG. 11 illustrates a side, vertical view of the bidet washing apparatus 100 and rotationally adjustable hinge fasteners 155a or 155b.

As shown in FIGS. 10 and 11, the rotationally adjustable hinge fasteners 155a and 155b allows the bidet washing apparatus 100 to pivot, allowing the bidet washing apparatus 100 to be raised from a horizontal to a more vertical position and lowered to its original horizontal position.

In some embodiments, the rotationally adjustable hinge fasteners 155a and 155b allows the bidet washing apparatus 100 to be raised from about 0 degrees to about 90 degrees, or from about 0 degrees to about 60 degrees, or from about 0 degrees to about 45 degrees, or from about 0 degrees to about 30 degrees, or from about 0 degrees to about 20 degrees, or from about 0 degrees to about 10 degrees.

In some embodiments, the rotationally adjustable hinge fasteners 155a and 155b may each be independently adjusted or rotated in a horizontal, planar direction, allowing the bidet washing apparatus 100 to be easily attachable to a toilet bowl 105 having structural differences or variations in the connecting portions or securing holes 120a and 120b present on the toilet bowl 105.

In some embodiments, the rotationally adjustable hinge fasteners 155a and 155b may independently be horizontally rotated from about 0 degrees to about 30 degrees, or from about 0 degrees to about 20 degrees, or from about 0 degrees to about 10 degrees, or from about 0 degrees to about 5 degrees, or from about 0 degrees to about 2.5 degrees.

In some embodiments, the rotationally adjustable hinge fasteners 155a and 155b may be made of any suitable size or shape. In some embodiments, the rotationally adjustable hinge fasteners 155a and 155b may be made of any suitable material including but not limited to metal, polymer, plastic, wood, or composite materials or any other materials known to those of skill in the art.

Figure 12:
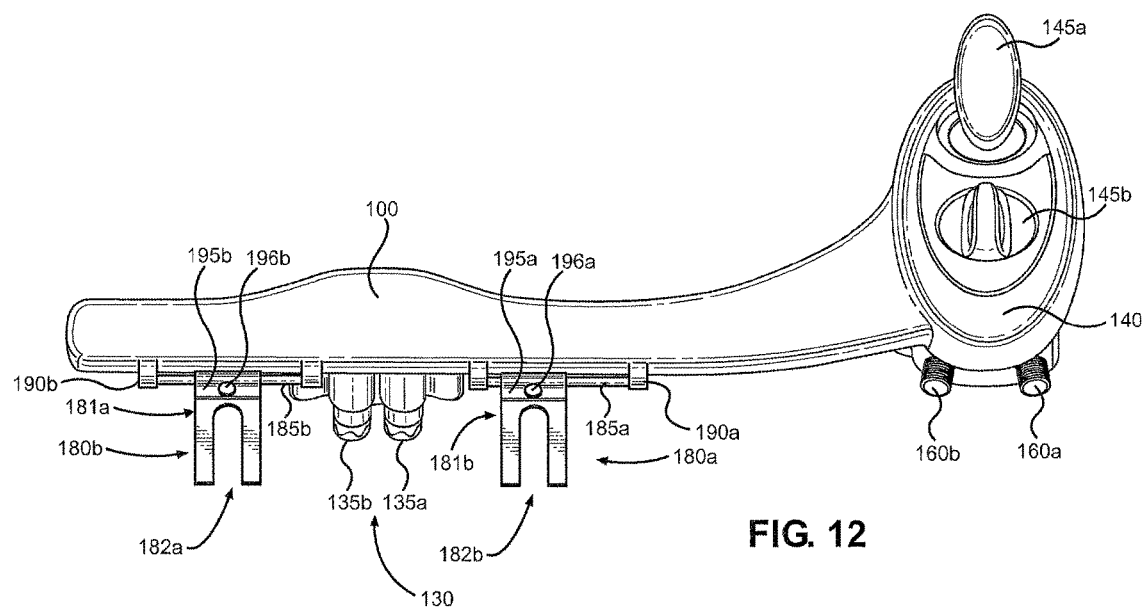
FIG. 12 is a top, rear perspective view of a bidet washing apparatus and slidably adjustable hinge fastener.

FIG. 12 illustrates a top, rear view of another embodiment of adjustable hinges for attaching a bidet washing apparatus 100 to a toilet bowl 105. This includes slidably adjustable hinge fasteners 180a and 180b; nozzle assembly 130; washing nozzles 135a and 135b; control unit 140; control switches 145a and 145b; and water inlets 160a and 160b. In an embodiment, water inlets 160a and 160b may be connected to a water source, for example, the refillable water tank 125.

As shown in FIG. 12, the slidably adjustable hinge fasteners 180a and 180b may be slidably shifted in a horizontal direction relative to the bidet washing apparatus 100, thus facilitating attachment of the bidet washing apparatus 100 to the toilet bowl 105 through the toilet bowl securing holes 120a and 120b (not shown) present on the toilet bowl 105. The slidably adjustable hinge fasteners 180a and 180b may also be pivoted or raised in a vertical direction relative to the bidet washing apparatus 100, thus facilitating cleaning of the bidet washing apparatus 100 and toilet bowl 105. In addition, the slidably adjustable hinge fasteners 180a and 180b also enables a user to change the angle of the nozzle assembly 130 by raising or lowering the bidet washing apparatus 100 during use. That is, the hinged operation is not only useful for being able to clean the toilet bowl or for easy installation, it can also be used as an apparatus that makes the whole bidet (and the nozzle angle) adjustable.

As shown in FIG. 12, in an embodiment the slidably adjustable hinge fasteners 180a and 180b may be arch shaped structures, each having an arch 181a and 181b, which connects with two arms 182a and 182b. In some embodiments, the arches 181a and 181b and two arms 182a and 182b, may be solid or hollowed out structures. The slidably adjustable hinge fasteners 180a and 180b may each independently be attachable to the rear of the bidet washing apparatus 100 at about the region of their arches 181a and 181b. In addition, the slidably adjustable hinge fasteners 180a and 180b may each independently be attachable to the rear portion of the toilet bowl securing holes 120a and 120b (not shown) through their two arms 182a and 182b using a bolt, nut and washer fastening assembly (not shown), or other suitable fastening assemblies known in the art.

As shown in FIG. 12, the rear of the bidet washing apparatus 100 may include longitudinal bars 185a and 185b, which are attachable to the rear of the bidet washing apparatus 100 by bracket holders 190a and 190b. In an embodiment, the horizontal bars 185a and 185b may be longer than the width of the slidably adjustable hinge fasteners 180a and 180b, and the bracket holders 190a and 190b may be positioned accordingly to support or hold the horizontal bars 185a and 185b in place. In some embodiments, the longitudinal bars 185a and 185b are about 0.5 inches to 5 inches longer, or from about 1 inch to about 4 inches longer, or from about 1.5 inches to about 3.5 inches longer, or from about 2 inches to about 3 inches longer than the width of the slidably adjustable hinge fasteners 180a and 180b.

In an embodiment, the arches 181a and 181b of the slidably adjustable hinge fasteners 180a and 180b, may include a top piece 195a and 195b, which loosely encircles or encompasses the longitudinal bars 185a and 185b, and may be crimped, glued, soldered, or fastened together by a screw 196a and 196b, or other suitable fastening means known in the art. In an embodiment, the top piece 195a and 195b may loosely encircle or encompass the longitudinal bars 185a and 185b, allowing slidable shifting of the slidably adjustable hinge fasteners 180a and 180b in a horizontal direction relative to the bidet washing apparatus 100, and pivotal raising of the slidably adjustable hinge fasteners 180a and 180b in a vertical direction relative to the bidet washing apparatus 100.

Figure 13:
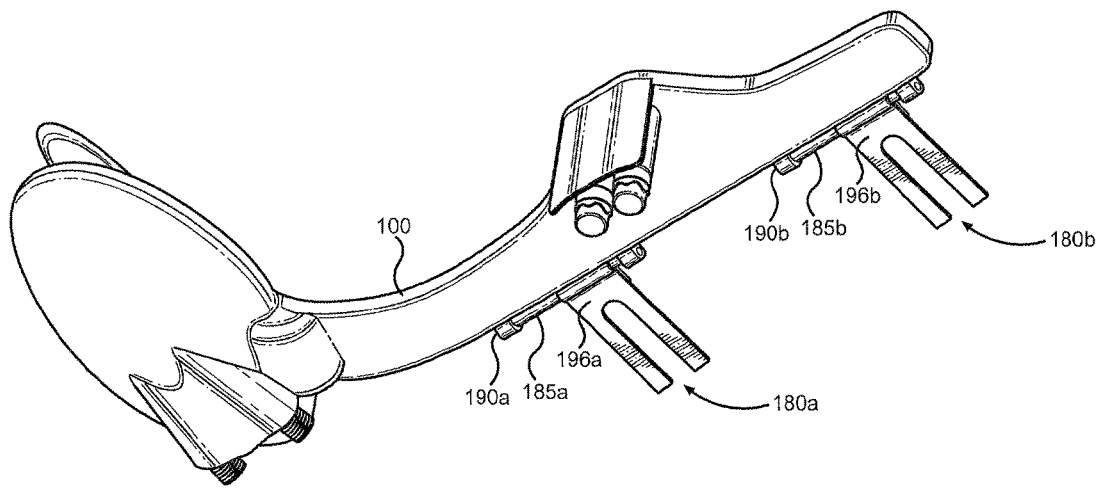
FIG. 13 is bottom, front, side perspective view of a bidet washing apparatus and slidably adjustable hinge fasteners.

FIG. 13 illustrates a bottom, front, side view of the bidet washing apparatus 100, slidably adjustable hinge fasteners 180a and 180b, longitudinal bars 185a and 185b, bracket holders 190a and 190b, and screws 196a and 196b.

Figure 14:
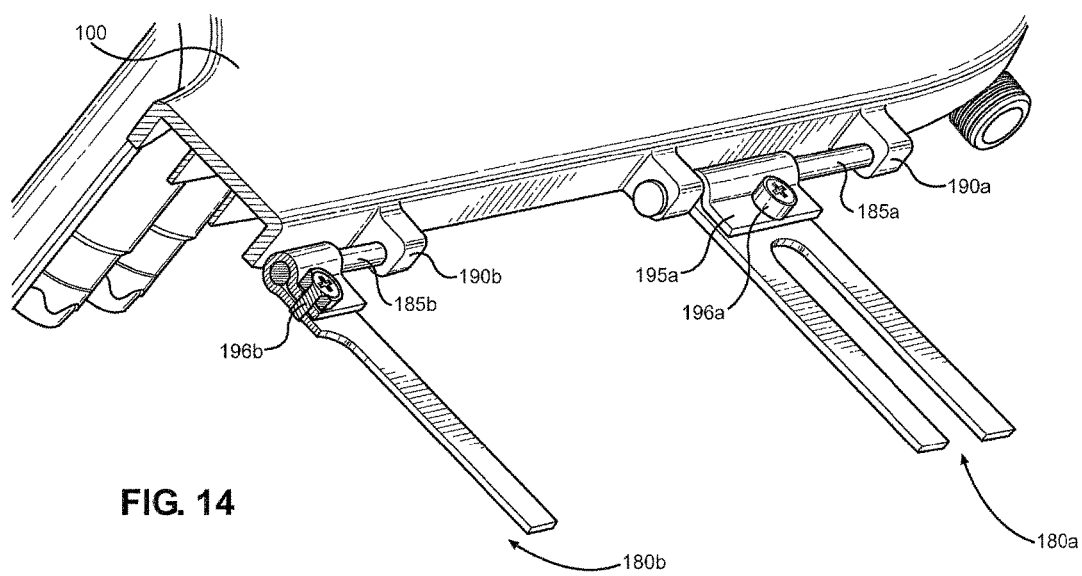
FIG. 14 is a cut-away top, side, rear perspective view of a bidet washing apparatus and slidably adjustable hinge fasteners.

FIG. 14 illustrates, a cut-away top, side, rear view of the bidet washing apparatus 100, slidably adjustable hinge fasteners 180a and 180b, longitudinal bars 185a and 185b, bracket holders 190a and 190b, and screws 196a and 196b.

Figure 15:
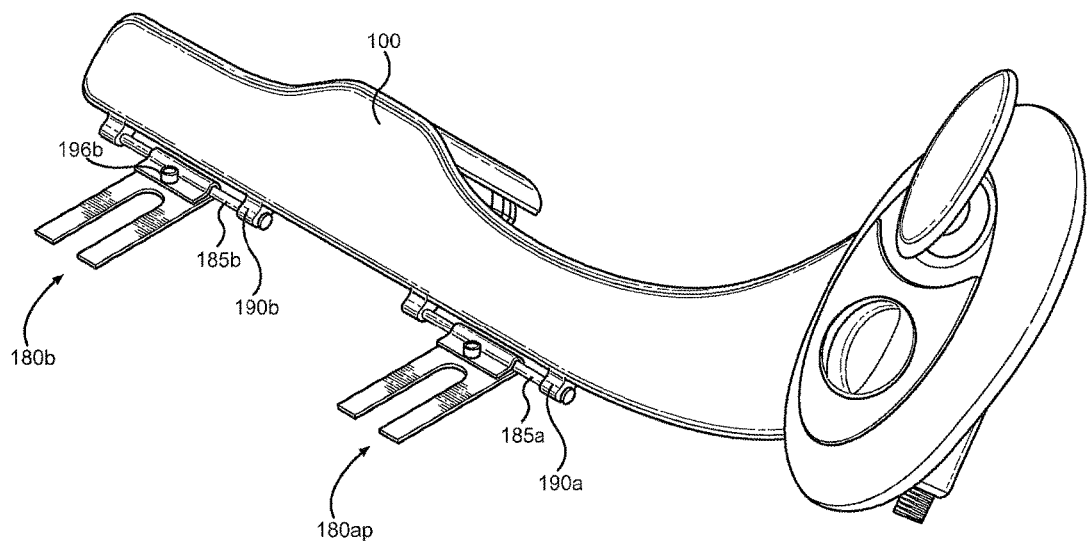
FIG. 15 is a top, side, rear perspective view of a bidet washing apparatus and slidably adjustable hinge fasteners.

FIG. 15 illustrates a top, side, rear view of the bidet washing apparatus 100, slidably adjustable hinge fasteners 180a and 180b, longitudinal bars 185a and 185b, bracket holders 190a and 190b, and screws 196a and 196b. As shown, the slidably adjustable hinge fasteners 180a and 180b may pivot in a vertical direction relative to the bidet washing apparatus 100, allowing the bidet washing apparatus 100 to be raised from a horizontal to a more vertical position and lowered to its original horizontal position.

Figure 16:
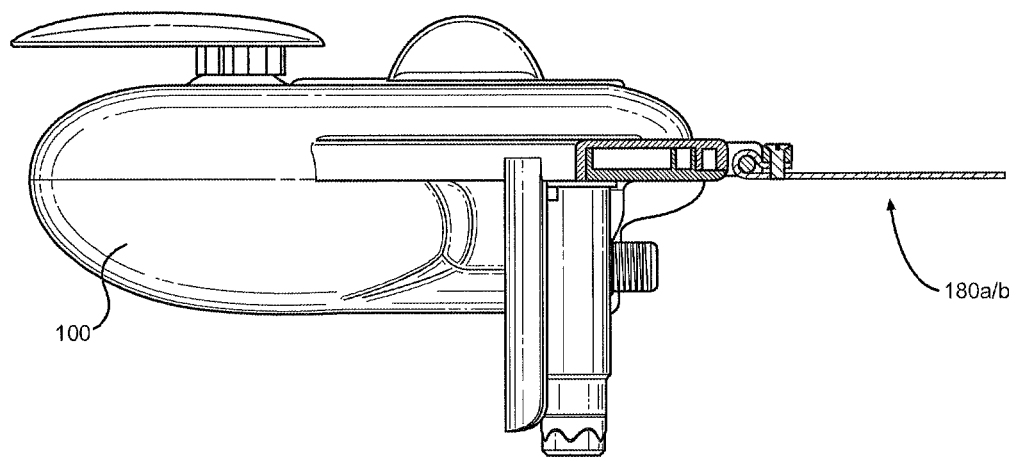
FIG. 16 is a side, horizontal perspective view of a bidet washing apparatus and a slidably adjustable hinge fastener.

FIG. 16 illustrates a side, horizontal view of the bidet washing apparatus 100 and slidably adjustable hinge fasteners 180a and 180b.

Figure 17:
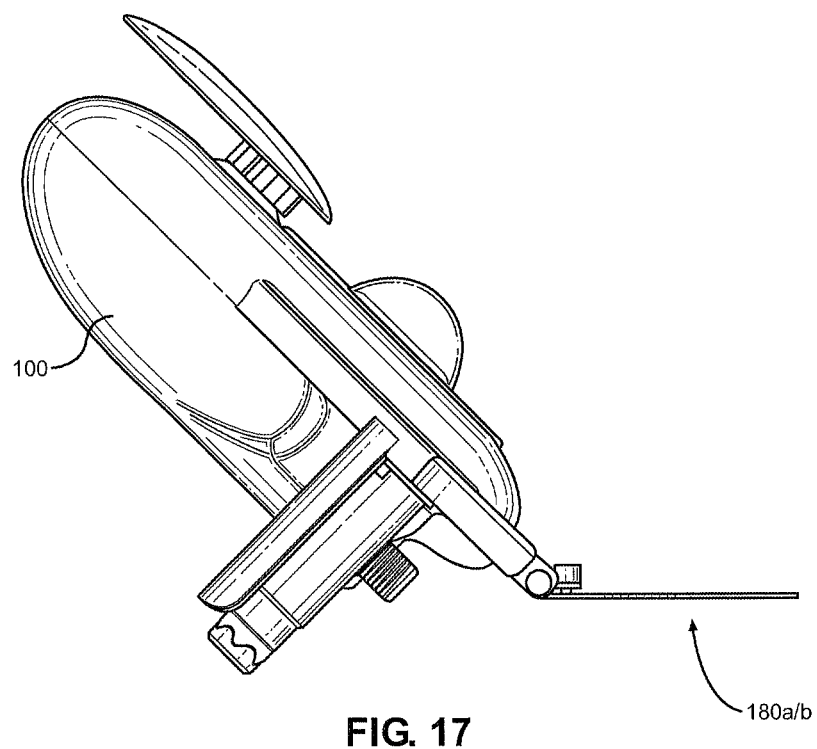
FIG. 17 is a side, vertical perspective view of a bidet washing apparatus and a slidably adjustable hinge fastener.

FIG. 17 illustrates a side, vertical view of the bidet washing apparatus 100 and slidably adjustable hinge fasteners 180a and 180b.

As shown in FIGS. 16 and 17, the slidably adjustable hinge fasteners 180a and 180b allow the bidet washing apparatus 100 to pivot, allowing the bidet washing apparatus 100 to be raised from a horizontal to a more vertical position and lowered to its original horizontal position.

In some embodiments, the slidably adjustable hinge fasteners 180a and 180b allow the bidet washing apparatus 100 to be raised from about O degrees to about 90 degrees, or from about O degrees to about 60 degrees, or from about O degrees to about 45 degrees, or from about O degrees to about 30 degrees, or from about 0 degrees to about 20 degrees, or from about O degrees to about 10 degrees.

In some embodiments, the slidably adjustable hinge fasteners 180a and 180b may each be independently slidably shifted in a horizontal direction relative to the bidet washing apparatus 100, thus facilitating attachment of the bidet washing apparatus 100 to the toilet bowl 105 through the toilet bowl securing holes 120a and 120b (not shown) present on the toilet bowl 105. In some embodiments, the slidably adjustable hinge fasteners 180a and 180b may each be independently slidably shifted from about 0.5 inches to 5 inches, or from about 1 inch to about 4 inches, or from about 1.5 inches to about 3.5 inches, or from about 2 inches to about 3 inches.

In some embodiments, the slidably adjustable hinge fasteners 180a and 180b may also be pivoted or raised in a vertical direction relative to the bidet washing apparatus 100, thus facilitating cleaning of the bidet washing apparatus 100 and toilet bowl 105.

In some embodiments, the slidably adjustable hinge fasteners 180a and 180b may be made of any suitable size or shape. In some embodiments, slidably adjustable hinge fasteners 180a and 180b may be made of any suitable material including but not limited to metal, polymer, plastic, wood, or composite materials or any other materials known to those of skill in the art.

Figure 18:
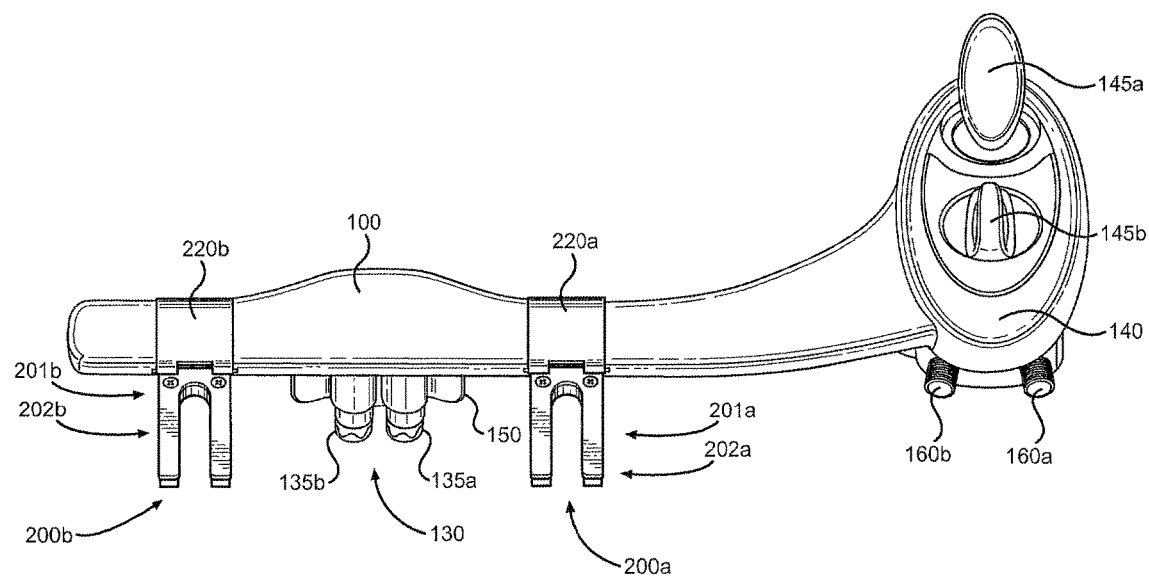
FIG. 18 is a top, rear perspective view of a bidet washing apparatus and grasping slidably adjustable hinge fasteners.

FIG. 18 illustrates a top, rear view of another embodiment of adjustable hinges for attaching a bidet washing apparatus 100 to a toilet bowl 105. This includes grasping slidably adjustable hinge fasteners 200a and 200b; nozzle assembly 130; washing nozzles 135a and 135b; protective shield gate 150; control unit 140; control switches 145a and 145b; and water inlets 160a and 160b. In an embodiment, water inlets 160a and 160b may be connected to a water source, for example, the refillable water tank 125.

As shown in FIG. 18, the grasping slidably adjustable hinge fasteners 200a and 200b may be slidably shifted in a horizontal direction relative to the bidet washing apparatus 100, thus facilitating attachment of the bidet washing apparatus 100 to the toilet bowl 105 through the securing holes 120a and 120b (not shown) present on the toilet bowl. The grasping slidably adjustable hinge fasteners 200a and 200b may also be pivoted or raised in a vertical direction relative to the bidet washing apparatus 100, thus facilitating cleaning of the bidet washing apparatus 100 and toilet bowl 105. In addition, the grasping slidably adjustable hinge fasteners 200a and 200b also enables a user to change the angle of the nozzle assembly 130 by raising or lowering the bidet washing apparatus 100 during use. That is, the hinged operation is not only useful for being able to clean the toilet bowl or for easy installation, it can also be used as an apparatus that makes the whole bidet (and the nozzle angle) adjustable.

As shown in FIG. 18, in an embodiment the grasping slidably adjustable hinge fasteners 200a and 200b may be arch shaped structures, each having an arch 201a and 201b, which connects to two arms 202a and 202b. In some embodiments, the arches 201a and 201b and two arms 202a and 202b may be solid or hollowed out structures. These grasping slidably adjustable hinge fasteners 200a and 200b may each independently be attachable to the bidet washing apparatus 100 at about the region of their arches 201a and 201b. In addition, the grasping slidably adjustable hinge fasteners 200a and 200b may each independently be connected to the rear portion of the toilet bowl securing holes 120a and 120b (not shown) through their two arms 202a and 202b using a bolt, nut and washer fastening assembly (not shown), or other similar fastening assemblies known in the art.

Figure 19:
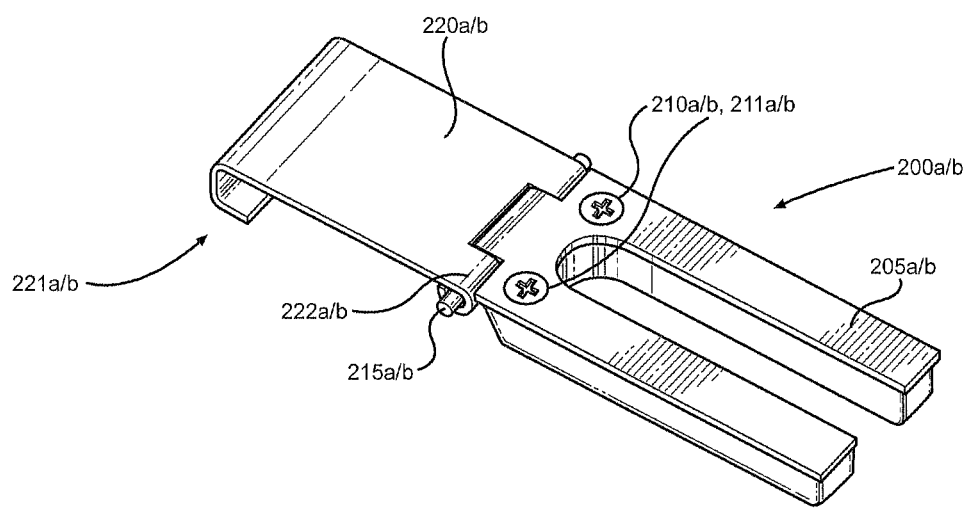
FIG. 19 is a top, front, side perspective view of a grasping slidably adjustable hinge fastener.

As shown in FIGS. 18 and 19, the grasping slidably adjustable hinge fasteners 200a and 200b may include plates 205a and 205b and one or more screws 210a/211a and 210b/211b. The arches 201a and 201b of the grasping slidably adjustable hinge fasteners 200a and 200b, may each independently be adjustably attachable to longitudinal bar 215a and 215b.

In an embodiment, the arches 201a and 201b of the grasping slidably adjustable hinge fasteners 200a and 200b, may include a top piece 202a and 202b, which loosely encircles or encompasses the longitudinal bar 215a and 215b, and may be crimped, glued, soldered, or fastened together by a screw (not shown), or other suitable fastening means known in the art. In an embodiment, the top piece 202a and 202b may loosely encircle or encompass the longitudinal bar 215a and 215b, allowing pivotal raising of the grasping slidably adjustable hinge fasteners 200a and 200b in a vertical direction relative to the bidet washing apparatus 100.

In an embodiment, the grasping slidably adjustable hinge fasteners 200a and 200b may also include grasping plates 220a and 220b, which includes top hooks 221a and 221b, and two bottom feet 222a and 222b. The top hooks 221a and 221b may be used to grasp onto and secure the bidet washing apparatus 100. The two bottom feet 222a and 222b may also be adjustably attachable to the longitudinal bar 215a and 215b. In some embodiments, the two bottom feet 222a and 222b may loosely encircle or encompass the longitudinal bar 215a and 215b, and may be secured by either being crimped, glued, soldered, or fastened together by a screw, or other suitable fastening means known in the art.

In an embodiment, the grasping plates 220a and 220b may be slidably shifted in a horizontal direction relative to the bidet washing apparatus 100. In another embodiment, the grasping plates 220a and 220b may be pivotally raised in a vertical direction relative to the bidet washing apparatus 100.

Figure 20:
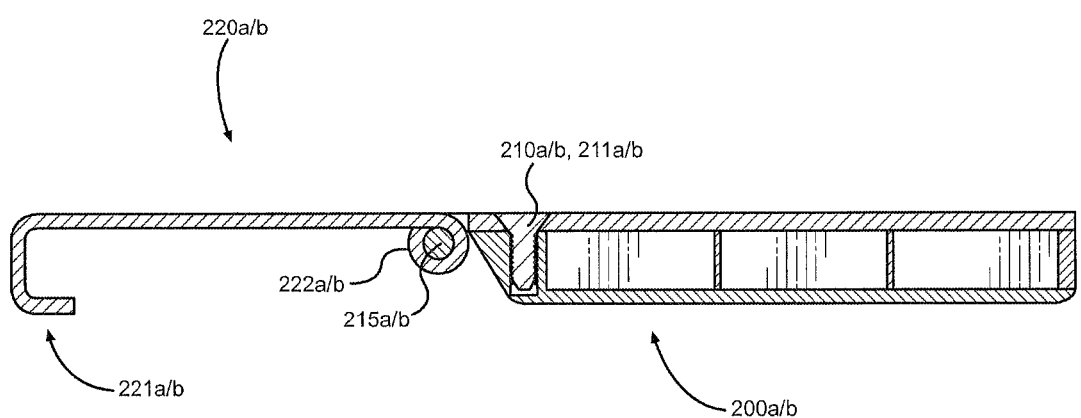
FIG. 20 is a side perspective view of a grasping slidably adjustable hinge fastener.

FIG. 20 illustrates a side view of the grasping slidably adjustable hinge fasteners 200a and 200b, screws 210a and 210b, longitudinal rod 215a and 215b, and grasping hook plate 220a and 220b.

Figure 21:
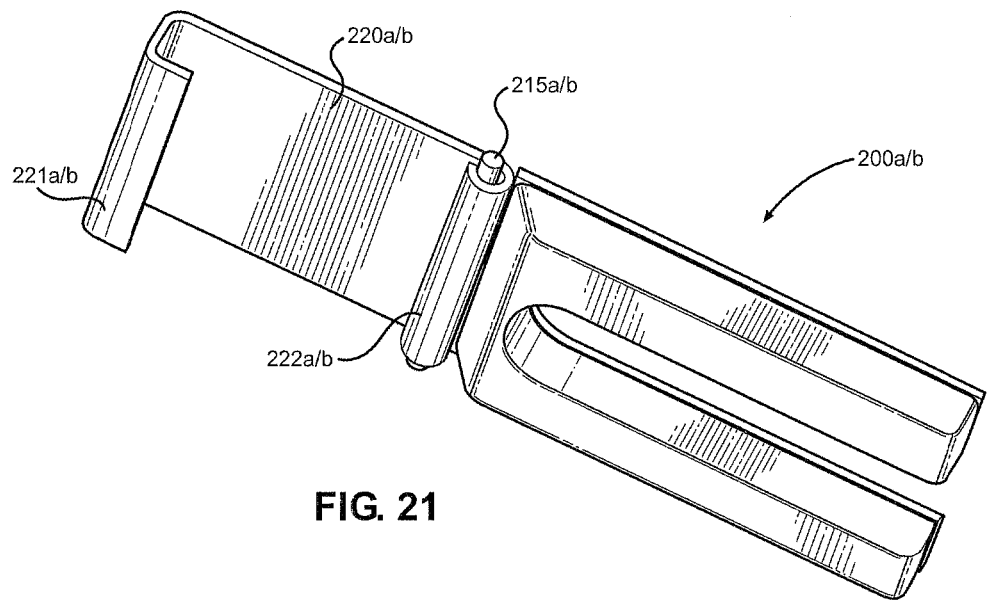
FIG. 21 is a bottom side perspective view of a grasping slidably adjustable hinge fastener.

FIG. 21 illustrates a bottom, side view of the grasping slidably adjustable hinge fasteners 200a and 200b, longitudinal rod 215a and 215b, and grasping hook plate 220a and 220b.

Figure 22:
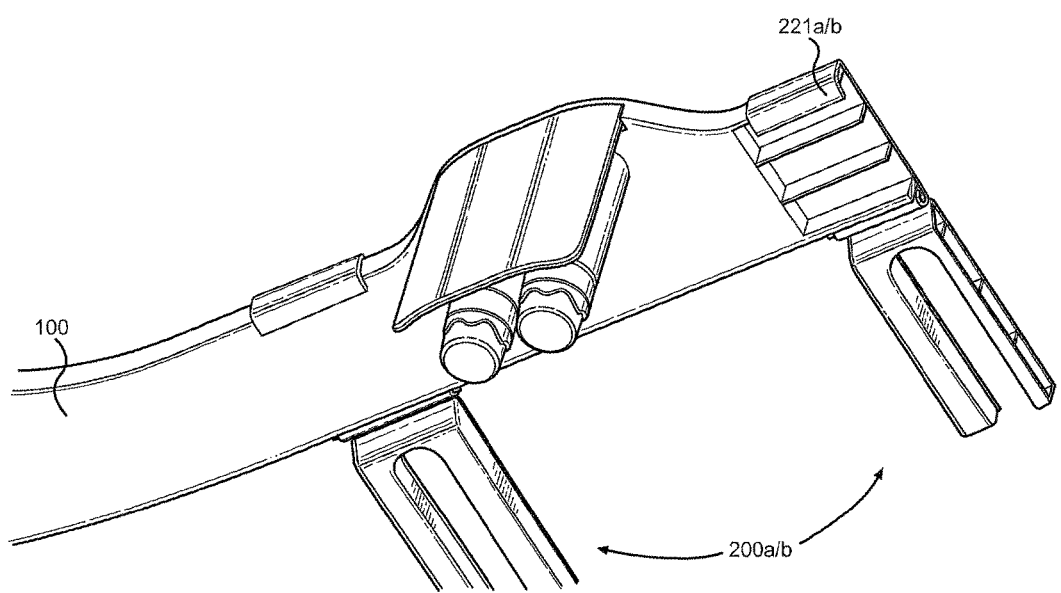
FIG. 22 is a bottom, front, side perspective view of a bidet washing apparatus and grasping slidably adjustable hinge fasteners.

FIG. 22 illustrates a bottom, front, side view of the bidet washing apparatus 100, which includes the grasping slidably adjustable hinge fasteners 200a and 200b and grasping hook plate 220a and 220b.

Figure 23:
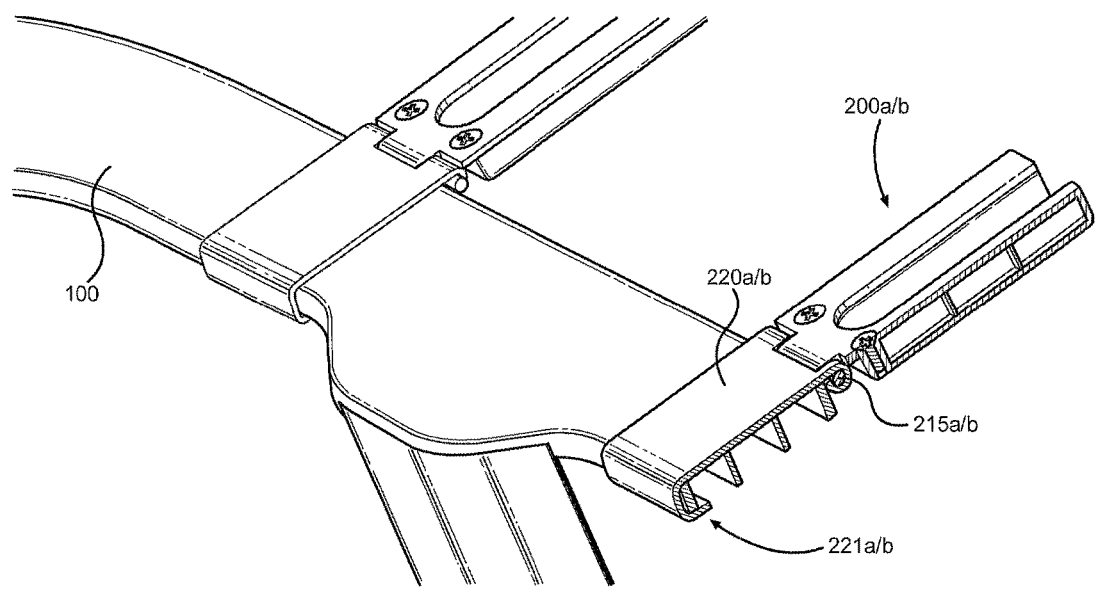
FIG. 23 is a cut-away top, front, side perspective view of a bidet washing apparatus and grasping slidably adjustable hinge fasteners.

FIG. 23 illustrates a cut-away top, front, side view of the bidet washing apparatus 100, which includes the grasping slidably adjustable hinge fasteners 200a and 200b, screws 210a/210b and 211a/211b, longitudinal rod 215a and 215b, and grasping hook plate 220a and 220b.

Figure 24:
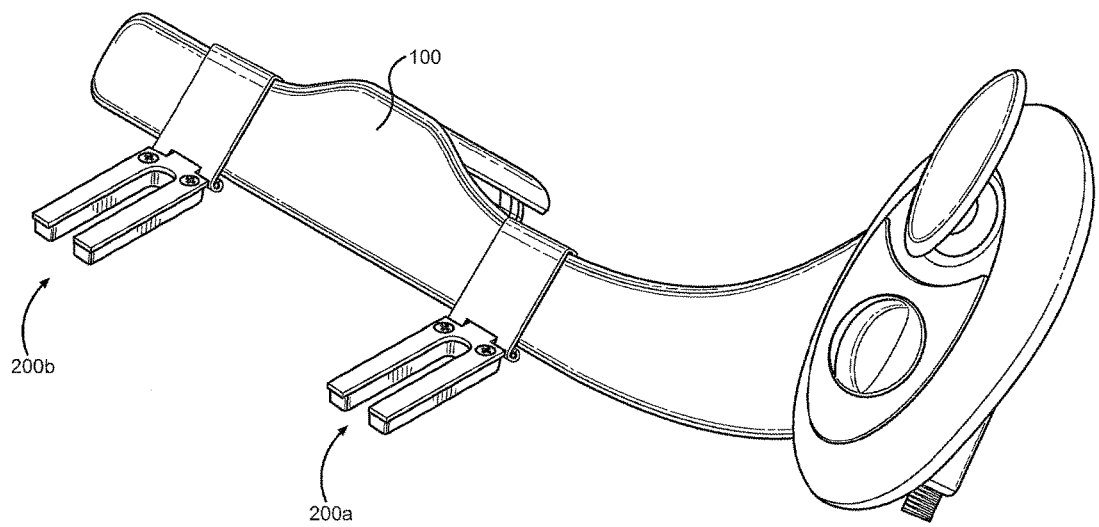
FIG. 24 is a top, side, rear perspective view of a bidet washing apparatus and grasping slidably adjustable hinge fasteners.

FIG. 24 illustrates a top, side rear view of the bidet washing apparatus 100 and grasping slidably adjustable hinge fasteners 200a and 200b. As shown, the grasping slidably adjustable hinge fasteners 200a and 200b may pivot in a vertical direction relative to the bidet washing apparatus 100, allowing the bidet washing apparatus 100 to be raised from a horizontal to a more vertical position and lowered to its original horizontal position.

Figure 25:
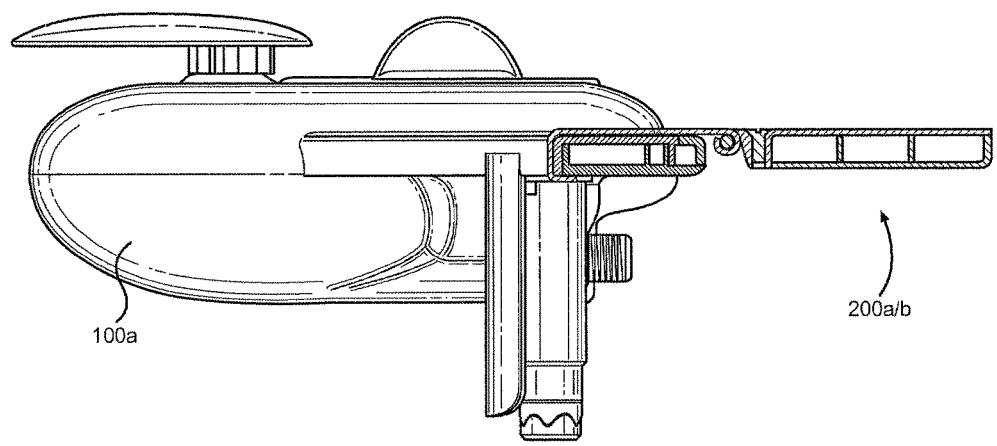
FIG. 25 is a side, horizontal perspective view of a bidet washing apparatus 100 and a grasping slidably adjustable hinge fastener.

FIG. 25 illustrates a side, horizontal view of the bidet washing apparatus 100 and grasping slidably adjustable hinge fasteners 200a and 200b.

Figure 26:
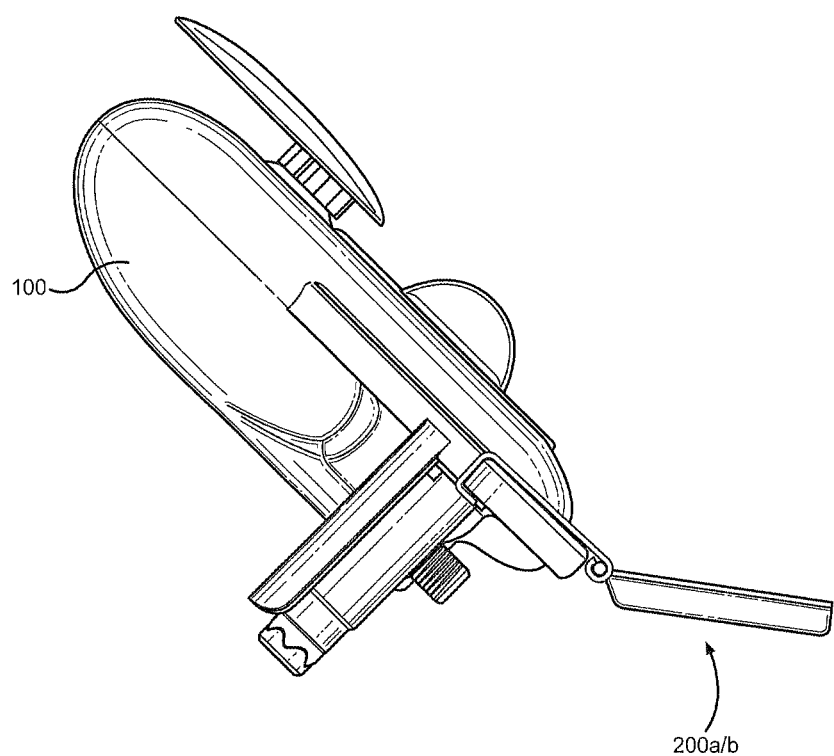
FIG. 26 is a side, vertical perspective view of a bidet washing apparatus and a grasping slidably adjustable hinge fastener.

FIG. 26 illustrates a side, vertical view of the bidet washing apparatus 100 and grasping slidably adjustable hinge fasteners 200a and 200b. As shown in FIG. 26, the grasping slidably adjustable hinge fasteners 200a and 200b allows the bidet washing apparatus 100 to be pivotally connected to the rear portion of the toilet bowl 105, allowing the apparatus 100 to be pivotally raised from a near horizontal position to a more vertical position, for cleaning purposes, and lowered for use.

In some embodiments, the grasping slidably adjustable hinge fasteners 200a and 200b allows the bidet washing apparatus 100 to be raised from about 0 degrees to about 90 degrees, or from about O degrees to about 60 degrees, or from about O degrees to about 45 degrees, or from about O degrees to about 30 degrees, or from about O degrees to about 20 degrees, or from about O degrees to about 10 degrees.

In some embodiments, the grasping slidably adjustable hinge fasteners 200a and 200b may each be independently adjusted in a longitudinal or horizontal manner, allowing the apparatus 100 to be easily attachable to toilet bowls 105 having structural differences or variations present in the connecting portions or securing holes 120a and 120b present on the toilet bowl 105. In some embodiments, the grasping slidably adjustable hinge fasteners 200a and 200b may independently be adjusted from about O inches to about 3 inches, or from about 1 inches to about 2 inches, or from about 0 inches to about 1 inch, or from O inches to about 0.5 inches.

In some embodiments, the grasping slidably adjustable hinge fasteners 200a and 200b may be made of any suitable size or shape having an arched-shaped structure with elongated arms.

In some embodiments, the grasping slidably adjustable hinge fasteners 200a and 200b may be made of any suitable material including but not limited to metal, polymer, plastic, wood, or composite materials or any other materials known to those of skill in the art.

While the inventive features have been particularly shown and described with reference to embodiments thereof, it will be understood by those in the art that the foregoing and other changes may be made therein without departing from the sprit and the scope of the disclosure. Likewise, the various diagrams may depict an example architectural or other configuration for the disclosure, which is done to aid in understanding the features and functionality that may be included in the disclosure. The disclosure is not restricted to the illustrated example architectures or configurations, but may be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead may be applied alone or in some combination, to one or more of the other embodiments of the disclosure, whether or not such embodiments are described, and whether or not such features are presented as being a part of a described embodiment. Thus, the breadth and scope of the present disclosure should not be limited by any of the above-described exemplary embodiments.

What is claimed is:

1. A bidet washing apparatus adjustably attachable to a toilet bowl for cleaning one or more body parts of a user, comprising:
    one or more adjustable hinge fasteners configured for adjustably securing the bidet washing apparatus to the toilet bowl, wherein the one or more adjustable hinge fasteners is one or more grasping slidably adjustable hinge fasteners, each comprising:
        a connector having an arch and two arms;
        a longitudinal bar and brackets; and
        a grasping plate with a top hook,
        wherein the arch of the connector and the longitudinal bar are pivotally attached,
        wherein the grasping plate with a top hook and longitudinal bar are pivotally attached, and
        wherein the bidet washing apparatus secured to the one or more grasping slidably adjustable hinge fasteners pivots in a vertical direction about the longitudinal bar;
    one or more water inlets configured to supply water;
    a control unit, housing one or more valves connected to the one or more water inlets, including one or more control switches configured to operate the one or more valves, wherein the one or more valves control water flow from the one or more water inlets; and
    a nozzle assembly including at least one washing nozzle, connected to at least one of the one or more valves with one or more water tubes, wherein the at least one washing nozzle is positioned for directing water to the one or more body parts of the user.

2. The bidet washing apparatus of claim 1, wherein the arch of the connector and the longitudinal bar are pivotally attached by an adjustable screw.

3. The bidet washing apparatus of claim 2, wherein the two arms of the connector are adjustably attachable to securing holes in the toilet bowl; and the longitudinal bar and brackets are adjustably attached to the bidet washing apparatus.

4. The bidet washing apparatus of claim 3, wherein each grasping plate with a top hook slides independently in a horizontal direction along the bidet washing apparatus, thus facilitating attaching the bidet washing apparatus to the toilet bowl.

5. A method of attaching the bidet washing apparatus of claim 1 to a toilet bowl, comprising:
   attaching one end of the one or more grasping slidably adjustable hinge fasteners to securing holes in the toilet bowl; and
   attaching the other end of the one or more adjustable hinge fasteners to the bidet washing apparatus.

6. The method of claim 5, wherein the one or more grasping slidably adjustable hinge fasteners each move independently in a horizontal direction, thus facilitating attaching the bidet washing apparatus to the toilet bowl.

7. The method of claim 5, wherein the one or more grasping slidably adjustable hinge fasteners each move independently in a vertical direction, thus facilitating cleaning of the toilet bowl.

* * * * *